Sept. 3, 1963     J. W. ATCHESON     3,102,511
ANIMAL FEEDER
Filed Dec. 13, 1961
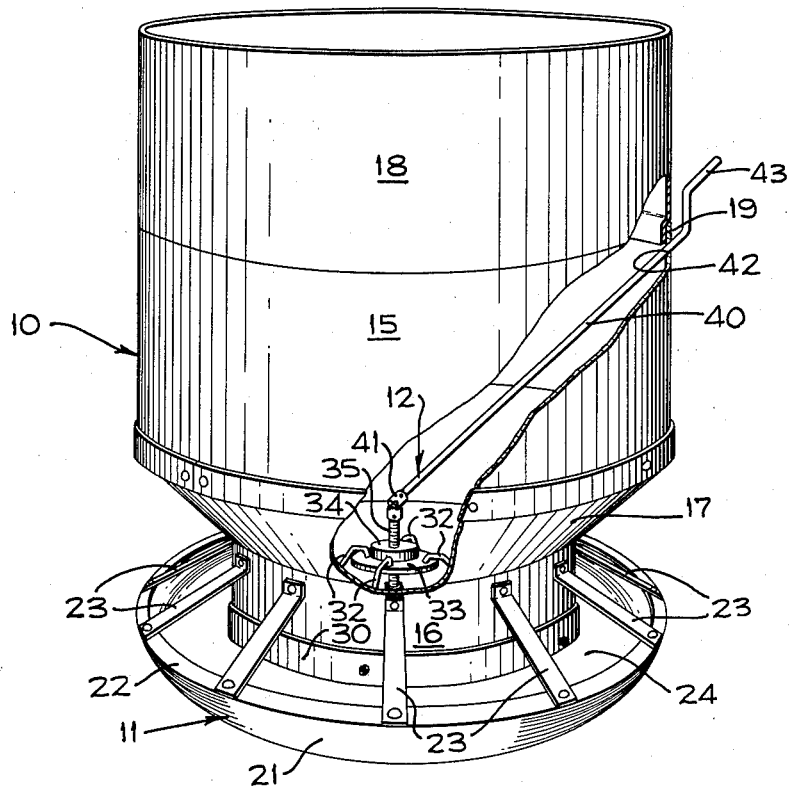
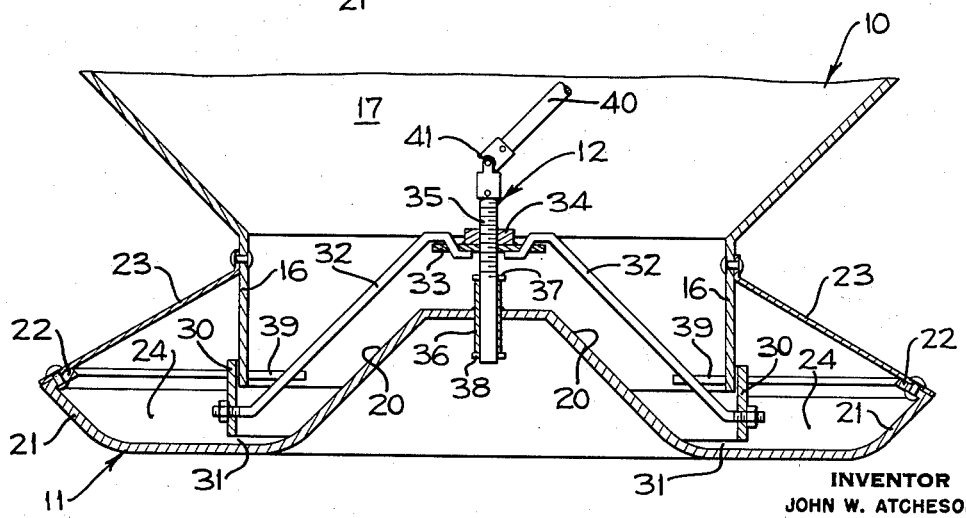
INVENTOR
JOHN W. ATCHESON
BY *Hans G. Hoffmeister*
ATTORNEY

United States Patent Office 3,102,511
Patented Sept. 3, 1963

3,102,511
ANIMAL FEEDER
John W. Atcheson, Tipton, Ind., assignor to FMC Corporation, San Jose, Calif., a corporation of Delaware
Filed Dec. 13, 1961, Ser. No. 159,036
5 Claims. (Cl. 119—53)

This invention pertains to animal feeders and more particularly to an adjustable animal feeder with an extendable hopper for increasing its capacity.

Domesticated animals such as chickens, turkeys, or hogs, must be fed at frequent intervals and therefore it has become the practice to use a feeding device whereby a regulated amount of feed is continuously present for the animals to feed upon. A common feeder of this type is constructed with a feed containing hopper having an open-ended neck portion which is disposed over a flat pan with upturned sides whereby a feed trough is formed between the sides of the pan and the neck portion. It is also the usual practice to provide an adjustable portion at the end of the neck portion to vary the spacing of the hopper above the pan and so regulate the size of the annular space or throat through which the feed gravitates into the trough. The adjustable portion is commonly adjusted by means of a screw arrangement with a rotatable actuating shaft which is extended upwardly through the center of the hopper to a position where it can be reached for manipulation by the attendant.

In feeders of the type described, the hopper is sometimes made extensible to increase its capacity by providing for the addition of one or more extension sections to the top of the hopper. However, such an extension of the hopper size involves a corresponding extension of the actuating shaft for the feed throat since the actuating means must be moved upwardly along with the top of the hopper in order to remain in a position where it can be readily utilized. This shifting of the position of the actuating means can be annoying, costly and time consuming for the farmer who wishes to change the feeding capacity of his hopper by the addition or subtraction of extension sections.

Also, the addition of extra sections to the hopper can place the adjustment means in an inconvenient location, as in hog feeders of the general type described where the use of hopper extension sections may increase the overall height to from eight to ten feet. It is apparent that for a hopper of this size it would be impossible to adjust the actuating means at the top of the hopper and at the same time watch the adjustment on the feed throat in order to make sure that it is the desired size. If the attendant is forced to adjust the throat by using a ladder or similar means, then climb down the ladder and stoop to see the effect of his adjustment on the feed throat, such adjusting can become extremely annoying and time consuming.

It is, therefore, an object of this invention to provide a livestock feeder which will always remain easily adjustable to regulate feed flow regardless of whether or not the capacity of the feeder has been increased by the addition of extra storage sections.

Another object of this invention is to provide an easily accessible adjustment device for an animal feeder which is positioned so that the feed throat may be watched as it is adjusted and which will remain in a single actuating position despite the addition of extension sections to the hopper.

Another object is to provide an improved screw type adjusting device for feeders which will permit easy operation in the regulation of the flow of feed.

Another object is to provide a feeding device whereby energy may be stored in the adjustable portion of the device to automatically effect an adjustment to the feed flow at a later time if the adjustable portion should be prevented from movement when it is actuated.

These and other objects and advantages of the present invention will become apparent from the following description and the accompanying drawings in which:

FIGURE 1 is a perspective of the feeder of the present invention partially broken away to show the adjusting mechanism; and FIGURE 2 is a fragmentary enlarged section of the feeder of FIGURE 1.

Referring now to the drawings which disclose an embodiment of the present invention, the feeder device is seen to comprise, in general, a hopper portion 10, a base pan 11, and an adjustment means 12. The feeder is adapted for use by numerous domesticated animals, such as hogs or various fowls, which will gather themselves around the base pan 11 to feed. The particular type of animals to be fed will, of course, determine the dimensions of the feeder to be used.

A loose grain-like feed may be stored within the hopper 10 and fed therefrom by gravitational force in a controlled manner. The hopper consists of a cylindrical body portion 15, a reduced neck portion 16, and a connecting shoulder or transition portion 17. The upper end of the body portion 15 is adapted to receive a cylindrical extension 18 for increasing the capacity of the hopper as the feeding requirements of the device may increase. The lower end of the extension 18 is positioned on the body portion 15 and includes an inwardly offset flange which engages the inner surface of the body 15 to form a tight-fitting joint 19. The outer surface of the extension is in alignment with the outer surface of the body portion to present a smooth exterior appearance. If necessary, additional extension sections can be added in a manner similar to that shown and described in connection with the extension 18 to increase the size of the hopper to any desired feed capacity.

The base pan 11 cooperates with the hopper structure to form a feed trough for the animals. The base pan comprises a flat pan with an upwardly extending frusto-conical feed diverting surface 20 and an upwardly turned side 21 having an inwardly bent rim portion 22. The neck portion 16 of the hopper encloses the feed diverting surface 20 and is fixed in position by support brackets 23 which are fastened to the rim 22 and to the neck 16 at regularly spaced intervals around the rim. A feed trough 24 is formed in the base pan 11 between the diverting surface 20 and the slide 21, with the slanted surface 20 being slick and serving to divert feed uniformly to all parts of the trough 24.

In order to regulate the flow of feed from the hopper into the feed trough 24, adjustment means 12 is provided whereby only a predetermined portion of feed flows into the trough 24 at any given time, the rest of the feed remaining in the hopper and being fed by gravity into the trough as it is needed to replace the feed eaten by the animals. For this purpose, an adjustable ring 30 is provided between the bottom of neck 16 and the bottom of the trough 24. Ring 30 is adjustably slidable over neck 16 to form a variable feed throat 31 which permits only a limited amount of the feed to flow into the trough from the hopper.

The adjustment ring 30 is supported for adjustment by four resilient spokes 32 which are spaced equi-laterally about the hopper, each spoke having one end secured to the ring. The other end of each spoke 32 has a hook shape and extends through a hole in a disc 33 which is affixed to an internally threaded collar 34. The hooked connection of the spokes to the disc assures movement of the spokes with the disc; however, if desired, the spokes may be otherwise secured to the disc. The collar 34 is screwed onto a rotatable shaft 35 which is rotatably mounted in the base pan 11 by means of a sleeve 36 that extends through and is fixed to the feed diverting surface 20. The shaft 35 is provided with pins 37 and 38 which extend therethrough and permit it to rotate within the sleeve 36 but prevent axial movement therein.

By rotating the shaft 35, the collar 34 is caused to move up or down the shaft depending on the direction of rotation to thereby raise or lower the ring 30 and adjust the feed throat 31. Relative rotation between the shaft 35 and collar 34 is assured since the collar is prevented from rotating with the shaft through stop members 39 which are secured to and project inwardly from the neck portion 16 of the hopper and intercept the resilient spokes 32 if the ring 30 tends to rotate.

The adjustment of the feed throat 31 is accomplished by the operator through an actuating rod 40 which is connected to the threaded shaft 35 by universal joint 41 for joint rotation. The actuating rod 40 is positioned at an angle to the shaft 35 so that it will extent laterally across the body portion 15 of the hopper projecting out of the hopper through access opening 42 to an easily accessible actuating position. The end of the rod 40 is provided with a crank 43 to facilitate the rotation thereof. It is to be noted that the position of the actuating crank 43 will not change even though the hopper may be enlarged through the addition of one or more extension sections 18. The adjustment of the feed throat 31 through which the feed enters the feed trough, therefore, is always a simple and relatively easy matter for the operator of the feeder in spite of changes in the hopper size, because the crank 43 will remain in its easily accessible position. Furthermore, the operator may watch the position of the ring 30 as he rotates crank 43 thereby observing the feed throat while adjusting it to its desired size to achieve a quick and simple adjustment.

The operation and adjustment of the feed device is performed by turning crank 43 and rotating the actuating rod 40 which in turn rotates the shaft 35 through the universal joint 41. Rotation of shaft 35 causes the collar 34 and hence the adjustment ring 30 to be raised or lowered in order to widen or narrow the feed throat. The feed, which may be grain or a similar type of material, will flow evenly over the feed diverting surface 20 and into the trough 24 where its accumulation will prevent the remainder of the feed in the hopper from flowing out. As the feed is used up in the trough, it will be replaced by feed which gravitates from the hopper.

The resiliency of the spokes 32 which support the adjustable ring 30 lend a further advantage to the adjustment structure. If an accumulation of feed under the ring prevents the immediate downward movement of the ring upon actuation thereof, the spokes 32 will flex to a certain extent to allow the collar 34 to be moved downwardly on the rotatable shaft 35 without corresponding movement of the ring. Thus, the spokes serve to store energy which will be released as the excess grain is removed from under the ring by the feeding animals, and the spokes will straighten out to lower the ring into its proper position.

From the foregoing description it is apparent that the novel structure of the present invention provides a feeding device having an improved adjustable feed throat whereby easy and quick regulation of the amount of feed in a feed trough is assured in spite of changes in the capacity of the feeder or in spite of blocking feed under the adjustable portion that serves to momentarily prevent adjustment of the feed throat.

While one embodiment of the present invention has been shown and described, it will be understood that various changes and modifications may be made therein without departing from the spirit of the invention or the scope of the appended claims.

The invention having thus been described what is believed to be new and desired to be protected by Letters Patent is:

1. A feeder comprising a base, a hopper fixedly supported by said base and having an open end overlying and spaced from said base, said open end and said base cooperating to define an annular opening therebetween, an adjustable member slidably mounted upon said hopper for varying the size of said annular opening, adjustment means for said adjustable member including a rotatable shaft extending axially of said hopper and a movable member operatively connected to said adjustable member and rotatably received on said shaft for movement therealong, an actutiang rod extending laterally of said hopper and through a side wall thereof with one end positioned exteriorly of said hopper, and a joint connecting the other end of said rod and said shaft for effecting the transfer of rotative motion between said axially misaligned shaft and actuating rod.

2. A feeder comprising a base, a tubular hopper fixed to said base and having an open end overlying and spaced from said base and an upper end including means for mounting an additional tubular section on the hopper, said open end cooperating with said base to define an annular opening therebetween, an adjustable annular member slidably mounted upon said hopper for varying the size of said annular opening, a threaded shaft rotatably mounted within said hopper and extending axially of said hopper, means rotatably mounted upon said shaft and connected to said adjustable member for raising and lowering said adjustable member, a tubular extension section removably mounted upon said upper end of the hopper, a rotatable rod having its axis at an angle to the axis of said shaft whereby said rod extends through a side wall of said hopper to a position outside of said hopper to actuate said adjustable member, and means connecting said shaft and said rod for effecting joint rotation therebetween.

3. A feeder comprising a base having a raised generally conical surface thereon, a tubular hopper fixed to said base and having an open end overlying said conical surface and an upper end including means for mounting an additional tubular section on the hopper, said open end and said base being spaced apart to define an annular opening therebetween, an adjustable annular member slidably mounted on said hopper for varying the size of said annular opening, a shaft rotatably mounted upon said conical surface and extending generally in the direction of the axis of said hopper, means rotatably connected to said shaft and secured to said adjustable member causing said adjustable member to move relatively to said shaft upon rotation thereof to vary said annular opening, a universal joint at the upper end of said shaft, a rotatable rod connected to said universal joint for jointly rotating said shaft, said rod having its axis at an angle to the axis of said shaft whereby said rod extends laterally of and projects through the side wall of said hopper, a tubular extension section removably mounted upon said upper end of the hopper, and means on said rod located exteriorly of said hopper for rotating the rod and thereby adjusting said annular opening.

4. A feeder comprising a base having a raised frusto-conical surface thereon, a tubular hopper fixed to said base and having an open end overlying said frusto-conical surface, said open end and said base being spaced apart to define an annular opening therebetween, and adjustable annular member slidably mounted on said hopper for varying the size of said annular opening, a threaded shaft rotatably mounted upon said frusto-conical surface and extending generally in the direction of the axis of said hopper, a threaded collar received on said shaft for movement therealong, a plurality of resilient spokes connected between said collar and said adjustable member permitting movement in said adjustable member in response to rotation of said shaft, said spokes being adapted to flex to store energy therein when the collar is moved toward the base and corresponding motion of the adjustable member is restrained so that the accurate gauging of the annular opening can be accomplished despite a temporary oversupply of feed at the opening, a universal joint at the upper end of said shaft, a rotatable rod connected to said universal joint for rotating said shaft, said rod having its axis at an angle to the axis of said shaft whereby said rod will extend laterally of and project through a side wall in said hopper, and means on said rod located exteriorly of said hopper for rotating the rod and thereby adjusting said annular opening.

5. A feeder comprising a base pan, a hopper fixed to said said base pan, said hopper having a tubular body portion for the storage of feed and an open lower end portion overlying and spaced from said base pan, said open lower end portion and said base cooperating to define an annular opening therebetween, and adjustable annular member slidably mounted upon said hopper for varying the size of said annular opening, said hopper having an open upper end portion including means for receiving a tubular body extension for increasing the capacity of the hopper, a shaft rotatably received by said base and extending axially into said body section of the hopper, means connected to said adjustable member and arranged for axial movement on said shaft in response to rotation of the shaft, an actuating rod extending laterally of said body section and through a side wall thereof with one end projecting exteriorly of said body section at a position below said upper end portion, and a universal joint connecting the other end of said rod and said shaft for joint rotation with the axis of said shaft forming an angle with the axis of said rod.

References Cited in the file of this patent

UNITED STATES PATENTS

| 1,020,505 | Huff | Mar. 19, 1912 |
| 2,485,832 | Keagle | Oct. 25, 1949 |
| 2,933,064 | Geerlings | Apr. 19, 1960 |